United States Patent [19]

Mizuno et al.

[11] Patent Number: 5,112,914
[45] Date of Patent: May 12, 1992

[54] RESIN COMPOSITION

[75] Inventors: Yukio Mizuno, Ehime; Takashi Maruyama, Ibaraki, both of Japan

[73] Assignee: Sumitomo Chemical Co., Ltd., Osaka, Japan

[21] Appl. No.: 472,184

[22] Filed: Jan. 30, 1990

[30] Foreign Application Priority Data

Jan. 30, 1989 [JP] Japan .................................. 1-22241

[51] Int. Cl.⁵ .................. C08G 65/48; C08G 61/32; C08G 67/02; C08G 71/12
[52] U.S. Cl. ............................. 525/134; 525/151; 525/393; 525/396; 525/397; 525/905
[58] Field of Search ............... 525/68, 134, 396, 397, 525/905, 393, 151

[56] References Cited

U.S. PATENT DOCUMENTS 4,209,427  6/1980  Williams .
4,315,086  2/1982  Ueno et al. .
4,642,358  10/1987  Aycock et al. .

FOREIGN PATENT DOCUMENTS 351140   1/1990  European Pat. Off. .
2853884  7/1979  Fed. Rep. of Germany .
17-15782 8/1942  Japan .
18-17812 7/1943  Japan .
49-98858 9/1974  Japan .
51-21664 7/1976  Japan .
60-221459 11/1985 Japan .
62-260855 11/1987 Japan .
62-263251 11/1987 Japan .

OTHER PUBLICATIONS

WPIL, File Supplier, AN=84-071081, Derwent Publications Ltd., London, GB; and JP-A-59 024 752 (Kanebo K.K.), Aug. 2, 1984.
USP 4,209,427, (O.G. Abstract of Jun. 24, 1980, p. 1401).
PCT Application WO/00850, Feb. 11, 1987, Brown et al.

Primary Examiner—Jacob Ziegler
Attorney, Agent, or Firm—Cushman, Darby & Cushman

[57] ABSTRACT

The present invention provides a resin composition excellent in solvent resistance, mechanical properties, heat resistance, and processability which comprises:
100 parts by weight of a composition comprising (A) 5-94 wt % of a modified polyphenylene ether resin and (B) 95-5 wt % of a thermoplastic polyester,
(C) 0-100 parts by weight of a rubber-like polymer, and
(D) 0.01-10 parts by weight of an amino resin obtained by modifying with an alcohol an addition reaction product of formaldehyde and at least one compound selected from the group consisting of melamine, guanamine and urea.

9 Claims, No Drawings

RESIN COMPOSITION

The present invention relates to a resin composition which comprises a polyphenylene ether and a thermoplastic polyester.

More particularly, it relates to a novel resin composition which comprises a resin composition comprising a polyphenylene ether resin modified with a polyfunctional compound, an epoxy compound or an organosilane compound and a thermoplastic polyester, to which are added an amino resin and, if necessary, a rubber-like polymer. This resin composition is excellent in solvent resistance, flowability, mechanical properties and processability.

The composition of the present invention can be made into shaped articles, sheets or films by injection molding, extrusion molding, etc.

Polyphenylene ether is superior in mechanical properties, heat resistance, electrical properties and besides in dimensional stability, and is noticed as a resin suitable for a wide range of uses, but it is defective in processability, impact strength and solvent resistance, for example, resistance to chemicals such as gasoline.

In order to improve processability and impact strength, Japanese Patent Kokoku No. 43-17812 and Japanese Patent Kokai No. 49-98858 have proposed blends of polyphenylene ether and polystyrene or rubber-reinforced polystyrene. However, such resin compositions are still inferior in solvent resistance.

Resin compositions comprising rubber-reinforced polystyrene/polyphenylene ether have excellent impact resistance and processability and so are much produced in industrial scale, but undergo limitation in its use due to its inferior solvent resistance.

Further, Japanese Patent Kokoku No. 42-15872 has proposed to add aromatic polycarbonate to polyphenylene ether. Although the resin composition comprising aromatic polycarbonate/polyphenylene ether is improved to some extent in processability without much lowering heat resistance of polyphenylene ether, this is still insufficient due to relatively high melt viscosity of aromatic polycarbonate, and besides solvent resistance is hardly improved.

Further, Japanese Patent Kokoku No. 51-21664 has proposed to add polyester for improvement of processability and solvent resistance of polyphenylene ether. However, polyphenylene ether and polyester are very poor in compatibility and the resulting resin composition is inferior in mechanical properties, especially when content of polyester exceeds 20%. Furthermore, molded articles obtained therefrom by injection molding show delamination phenomenon, and good molded articles cannot be obtained.

As methods to improve these defects, Japanese Patent Kokai No. 60-221459 has proposed to add a copolymer of a monomeric unsaturated compound having epoxy group and styrene to polyphenylene ether, Japanese Patent Kokai No. 62-260855 has proposed to add maleic anhydride, Japanese Patent Kokai No. 62-263251 has proposed to add a copolymer of styrene and unsaturated carboxylic acid, and Japanese Patent Kohyo No. 63-500387 has proposed to add at least one polymer containing aromatic polycarbonate unit or a blend of this polymer with styrene homopolymer. However, these methods are still unsatisfactory The inventors have already found a resin composition excellent in mechanical properties and solvent resistance, good in processability and well-balanced in properties, which comprises polyphenylene ether, a thermoplastic polyester resin and an amino resin, and have filed a patent application thereon (Japanese Patent Application No. 63-165376). However, this resin composition is found to be still unsatisfactory in mechanical properties in practical use.

The principal object of the present invention is to provide a practical resin composition which is improved in compatibility between polyphenylene ether and thermoplastic polyester and which is excellent in solvent resistance as well as heat resistance and impact strength.

As a result of the inventors' intensive research conducted in an attempt to develop a technique effective to improve resin compositions comprising polyphenylene ether and thermoplastic polyester, it has been found that a resin composition excellent in solvent resistance, mechanical properties, heat resistance and processability can be obtained by adding an amino resin and, if necessary, a rubber-like polymer to a resin composition comprising a polyphenylene ether resin modified with a polyfunctional compound, an epoxy compound or an organosilane compound and a thermoplastic polyester.

That is, the present invention relates to a resin composition which comprises:

100 parts by weight of a composition comprising (A) 5-95 wt% of a modified polyphenylene ether resin and (B) 95-5 wt% of a thermoplastic polyester, (C) 0-100 parts by weight of a rubber-like polymer, and (D) 0.01-10 parts by weight of an amino resin obtained by modifying with an alcohol an addition reaction product of formaldehyde and at least one compound selected from melamine, guanamine and urea.

The present invention further relates to a resin composition which comprises the above resin composition to which is added (M) an aromatic vinyl polymer, a copolymer of an aromatic vinyl compound with another monomer or a rubber-modified aromatic vinyl polymer.

The modified polyphenylene ether resin (A) herein means a polyphenylene ether which has been obtained by modifying polyphenylene ether with a polyfunctional compound (E), an epoxy compound (J), an organosilane compound (K) or the like.

The polyphenylene ether (A) used in the present invention is a polymer obtained by oxidation polymerization of a phenol compound represented by the following formula (IV):

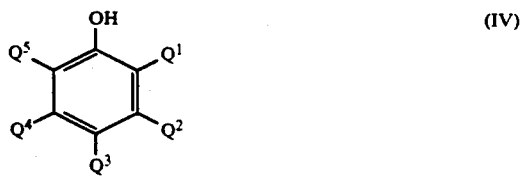
(IV)

(wherein $Q^1$, $Q^2$, $Q^3$, $Q^4$ and $Q^5$ each represent a hydrogen atom, a halogen atom or a substituted or unsubstituted hydrocarbon residue and at least one of them is a hydrogen atom) with oxygen or a gas containing oxygen using an oxidation coupling catalyst.

Examples of $Q^1$, $Q^2$, $Q^3$, $Q^4$ and $Q^5$ in the above formula (IV) are hydrogen atom, chlorine atom, fluorine atom, bromine atom, iodine atom, methyl group, ethyl group, propyl group, butyl group, chloroethyl group, hydroxyethyl group, phenylethyl group, benzyl group, hydroxymethyl group, carboxyethyl group, methoxycarbonylethyl group, cyanoethyl group, phenyl group, chlorophenyl group, methylphenyl group, dimethylphenyl group and ethylphenyl group.

Examples of the phenol compounds as shown by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol and 2,3,5-, 2,3,6- or 2,4,6-trimethylphenol. These phenol compounds may be used singly or in combination of two or more.

Further, the phenol compounds of the above formula may be copolymerized with other phenol compounds, for example, dihydric phenols such as bisphenol A, tetrabromobisphenol A, resorcin and hydroquinone.

Among the above, especially preferred polyphenylene ethers are homopolymers and copolymers of 2,6-dimethylphenol and 2,3,6-trimethylphenol.

Any oxidation coupling catalysts can be used for oxidation polymerization of the phenol compounds as far as they have polymerization ability. Typical examples thereof are cuprous salt/tert. amine such as cuprous chloride/trimethylamine, cuprous chloride/triethylamine and cuprous chloride/pyridine; cupric salt/tert. amine/alkali metal hydroxide such as cupric chloride/pyridine/potassium hydroxide; manganese salt/primary amine such as manganese chloride/ethanolamine and manganese acetate/ethylenediamine; manganese salt/alcoholate or phenolate such as manganese chloride/sodium methylate and manganese chloride/sodium phenolate; manganese salt/alkali hydroxide/amine such as manganese chloride/NaOH/diethanolamine/dibutylamine, manganese chloride/NaOH/triethanolamine/dibutylamine and manganese chloride/NaOH/monoethanolamine/dibutylamine and cobalt salt/tert. amine.

Intrinsic viscosity (measured in chloroform at 30° C.) of polyphenylene ether used in the present invention has no special limitation but is preferably 0.2–1.0 dl/g, more preferably 0.25–0.6 dl/g, and optimum intrinsic viscosity can be selected depending on circumstance.

Polyfunctional compounds (E) used as a modifier for polyphenylene ether in the present invention are those which have in their molecule at least one of carboxyl group, acid anhydride group, acid amide group, imide group, carboxylic acid ester group, epoxy group, amino group and hydroxyl group. Preferred are compounds (F) which have in their molecule both (a) carbon-carbon double bond or carbon-carbon triple bond and (b) at least one of carboxylic acid group, acid anhydride group, acid amide group, imide group, carboxylic acid ester group, epoxy group, amino group and hydroxyl group.

Examples of compounds (F) are maleic anhydride, maleic acid, fumaric acid, maleimide, maleic acid hydrazide, reaction products of maleic anhydride and diamine, for example, compounds having the formulas:

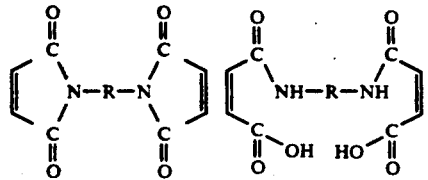

(wherein R is an aliphatic or aromatic group), methylnadic anhydride, dichloromaleic anhydride, maleic acid amide, natural fats and oils such as soybean oil, tung oil, caster oil, linseed oil, hempseed oil, cottonseed oil, sesame oil, rapeseed oil, peanut oil, camellia oil, olive oil, coconut oil and sardine oil; epoxidized natural fats and oils such as epoxidized soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linolenic acid, octadecatrienoic acid, eicosadienoic acid, eicosatrienoic acid, eicosatetraenoic acid, ricinoleic acid, eleosteric acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid and triacetontenoic acid; and esters, acid amides and anhydrides of these unsaturated carboxylic acids; unsaturated alcohols such as allyl alcohol, crotyl alcohol, methylvinyl carbinol, allyl carbinol, methylpropenyl carbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$ or $C_nH_{2n-9}OH$ (n is a positive integer), 3-butene-1,2-diol, 2,5-dimethyl-3-hexene-2,5-diol, 1,5-hexadiene-3,4-diol, and 2,6-octadiene-4,5-diol; unsaturated amines such as ones where an OH group of these unsaturated alcohols is replaced by an —NH₂ group; and low polymers (e.g., 500–10,000 in average molecular weight) such as butadiene and isoprene and high polymers (e.g., 10,000 or more in average molecular weight) to which is added maleic anhydride or a phenol or into which is introduced amino group, carboxyl group, hydroxyl group, epoxy group or the like.

Other preferred examples of polyfunctional compounds (E) are aliphatic carboxylic acids, acid esters, and acid amides represented by the formula (G):

$$(R^IO)_mR(COOR^{II})_n(CONR^{III}R^{IV})_s \qquad (G)$$

(wherein R represents a linear or branched saturated aliphatic hydrocarbon residue having 2-20 carbon atoms; $R^I$ each independently represents a hydrogen atom or an alkyl, aryl acyl or carbonyldioxy group having 1-10 carbon atom; $R^{II}$ each independently represents a hydrogen atom or an alkyl or aryl group having 1-20 carbon atoms; $R^{III}$ and $R^{IV}$ each independently represent a hydrogen atom or an alkyl or aryl group having 1-10 carbon atoms; m, n and s each represent 0 or an integer of 1 or more and meet $m+n+s \leq 2$) and derivatives thereof.

As examples of compounds (G), mention may be made of hydroxyacetic acid, lactic acid, α-hydroxy-n-butyric acid, α-hydroxyisobutyric acid, α-hydroxy-n-valeric acid, α-hydroxyisovaleric acid, 2-hydroxy-2- methylbutanoic acid, α-hydroxy-n-caproic acid, α-hydroxyisocaproic acid, 2-ethyl-2-hydroxybutanoic acid, 2-hydroxy-3,3-dimethylbutanoic acid, 2-hydroxy-2-methylpentanoic acid, 2-hydroxy-5-methylhexanoic acid, 2-hydroxy-2,4-dimethylpentanoic acid, 3-hydroxypropionic acid, β-hydroxybutyric acid, β-hydroxyisobutyric acid, β-hydroxy-n-valeric acid, β-hydroxyisovaleric acid, 2-hydroxymethylbutanoic acid, hydroxypivalic acid, 3-hydroxy-2-methylpentanoic acid, 1,1-hydroxytetradecanoic acid, jalapinolic acid, 1,4-hydroxyhexadecanoic acid, sabinic acid, juniperic acid, hydroxymalonic acid, methyltartronic acid, ethyltartronic acid, n-propyltartronic acid, isopropyltartronic acid, hydroxymethylmalonic acid, hydroxyisopropylmalonic acid, ethylhydroxymethylmalonic acid, malic acid, α-methylmalic acid, α-hydroxy-α'-methylsuccinic acid, α-hydroxy-α',α'-dimethylsuccinic acid, α-hydroxy-α,α'-diethylsuccinic acid, α-hydroxy-α'-methyl-α-ethylsuccinic acid, α-hydroxy-α'-methyl-α-ethylsuccinic acid, trimethylmalic acid, α-hydroxyglutaric acid, β-hydroxyglutaric acid, β-hydroxy-β-methylglutaric acid, α-hydroxyadipic acid, citric acid, isocitric acid, norcaperatic acid, agaricic acid, glyceric acid, α,β-dihydroxybutyric acid, α,β-dihydroxyisobutyric acid, β,β'-di-hydroxyisobutyric acid, β,γ-dihydroxybutyric acid, α,γ-dihyroxy-β,β-dimethylbutyric acid, α,β-dihydroxy-α-isopropylbutyric acid, ipuroic acid, ustilic acid-A, 9,10-dihydroxyoctadecanoic acid, tartaric acid (optically active form or racemic form), mesotartaric acid, methyltartaric acid, α,β-dihydroxyglutaric acid, α,γ-dihydroxyglutaric acid, α,γ-dihydroxy-β-methylglutaric acid, α,γ-dihydroxy-β-methyl-β-ethylglutaric acid, α,γ-dihydroxy-α,γ-dimethylglutaric acid, α,δ-dihydroxyadipic acid, β-γ-dihydroxyadipic acid, 6,7-dihydroxydodecanoic diacid, 7,8-dihydroxyhexadecanoic diacid, furoionic acid, trihydroxybutyric acid, trihydroxyisobutyric acid, trihydroxyglutaric acid, succinic acid, glutaric acid, adipic acid, α-methylglutaric acid, and dodecanoic diacid.

Furthermore, the derivatives of the above formula include lactones, acid anhydrides, alkali metal salts, alkaline earth metal salts, and salts with amines. As examples thereof, mention may be made of β-propiolactone, glycollide, lactide, β-methylpropiolactone, β,β-dimethylpropiolactone, β-n-propylpropiolactone, β-isopropylpropiolactone, β-methyl-β-ethylpropiolactone, γ-butyrolactone, γ-valerolactone, δ-valerolactone, δ-caprolactone, ε-caprolactone, 1,5-hydroxypentadecanoic acid lactone, γ-butyrolactone-α-carboxylic acid, paraconic acid, α-methylparaconic acid, β-methylparaconic acid, α-ethylparaconic acid, α-isopropylparaconic acid, γ-methylparaconic acid, γ-ethylparaconic acid, α,γ-dimethylparaconic acid, β,γ-dimethylparaconic acid, α,α,β-trimethylparaconic acid, γ,γ-dimethylparaconic acid, nephrosteraic acid, γ-valerolactone-γ-carboxylic acid, γ-isopropyl-γ-butyrolactone-γ-carboxylic acid, α,α-dimethyl-γ-butyrolactone-γ-carboxylic acid, β-methyl-γ-valerolactone-γ-carboxylic acid, α,β-dimethyl-γ-valerolactone-γ-carboxylic acid, α,β-dimethyl-γ-butyrolactone-γ-carboxylic acid, homoisocarpinic acid, α-(γ-oxycarbonylpropyl)-γ-butyrolactone, β-hydroxyadipic acid-γ-lactone, α,δ-dimethyl-β-hydroxyadipic acid-γ-lactone, α-(δ'-carboxy-n-butyl)-γ-butyrolactone, α-methylisocitric acid lactone, cinchonic acid, α-hydroxy-γ-butyrolactone, β-hydroxy-γ-butyrolactone, δ-hydroxy-γ-valerolactone, pantolactone, mevalonic acid, malic anhydride, tartaric anhydride, hydroxyglutaric anhydride, α,β,γ-trihydroxyvaleric acid lactone, α-hydroxy-α-hydroxymethyl-γ-butyrolactone, succinic anhydride and glutaric anhydride. These may be used singly or in combination of two or more.

Among them, especially preferred are tartaric acid, malic acid, citric acid, and derivatives thereof. These include acids in various commerically available forms such as anhydrides or hydrates. Examples of useful derivatives are acetyl citrate, monostearyl or distearyl citrate, N,N'-diethylcitric acid amide, N,N'-dipropylcitric acid amide, N-phenylcitric acid amide, N-dodecylcitric acid amide, N,N'-didodecylcitric acid amide, N-dodecylcitric acid amide, calcium malate, calcium citrate, potassium malate and potassium citrate.

As other preferred polyfunctional compounds (E), mention may be made of compounds (H) which have in their molecule both (a) acid halide group, most preferably acid chloride group and (b) at least one of carboxyl group, carboxylic anhydride group, acid ester group and acid amide group, preferably carboxyl group and carboxylic anhydride group.

As examples of compounds (H), mention may be made of anhydrotrimellitic acid chloride, chloroformylcitric anhydride, chloroformylcitric acid, chloroformylglutaric anhydride, chloroformylglutaric acid, chloroacetylcitric anhydride, chloroacetylcitric acid, trimellitic acid chloride and chloroacetylglutaric acid. Anhydrotrimellitic acid chloride is especially preferred.

These compounds (F), (G) and (H) are mentioned in detail in U.S. Pat. Nos. 4,315,086 and 4,642,358 which are incorporated by reference herein.

Epoxy compound (J) used as a modifier in the present invention is an epoxy compound comprising a compound having oxirane group in its molecule and/or a condensation polymer of a dihydric phenol and epichlorohydrin.

Examples of epoxy compound (J) include epoxides of olefins or cycloalkenes such as ethylene oxide, propylene oxide and cyclohexene oxide. They further include condensates of a dihydric phenol and epichlorohydrin at various ratios and typical examples thereof are condensates of bisphenol A and epichlorohydrin such as commercially available SUMIEPOXY® ELA-115, ELA-127, ELA-128, ELA-134, ESA-011, ESA-014, ESA-017 ESA-019 manufactured by Sumitomo Chemical Co., Ltd. and phenoxy resins of Union Carbide Corp., condensates of resorcin and epichlorohydrin, condensates of hydroquinone and epichlorohydrin, condensates of tetrabromobisphenol A and epichlorohydrin, and glycidyl etherification products of phenol novolak or cresol novolak such as a product line of SUMIEPOXY® ESCN-220 manufactured by Sumitomo Chemical Co., Ltd.

Further included are condensates of polyhydric alcohol and epichlorohydrin, and typical examples of the polyhydric alcohols are ethylene glycol, propylene glycol, butylene glycol, polyethylene glycol, polypropylene glycol, glycerine, trimethylolethane, trimethylolpropane and pentaerythritol.

Further examples are glycidyl etherification products of monohydric phenols or monohydric alcohols such as phenylglycidyl ether, butylglycidyl ether and cresylglycidyl ether.

Furthermore, mention may be made of glycidylation products of amine compounds such as commercially available SUMIEPOXY® ELIN-125, which is a diglycidylation product of aniline, supplied by Sumitomo Chemical Co., Ltd.

Furthermore, there may be used polymers of epoxy-containing unsaturated compounds such as glycidyl acrylate, glycidyl methacrylate and allyl glycidyl ether and copolymers of epoxy-containing unsaturated compound and at least one of other monomers such as ethylene, propylene, butene, styrene, α-methylstyrene, 4-methylpentene, chlorostyrene, bromostyrene, acrylic acid, acrylic acid esters, acrylonitrile, vinyl chloride, methacrylic acid, methacrylic acid esters, maleic anhydride and vinyl acetate. Of these polymers, especially preferred are styrene-glycidylacrylate or glycidylmethacrylate copolymer and ethylene-glycidylacrylate or glycidylmethacrylate copolymer.

Organosilane compound (K) used in the present invention is an organosilane compound which has in its molecule simultaneously (a) at least one silicon atom which bonds to a carbon atom through an oxygen atom, (b) carbon-carbon double bond or carbon-carbon triple bond, and (c) at least one functional group selected from amino group, mercapto group, carboxyl group, acid anhydride group, acid amide group, carboxylic acid ester group, imide group and hydroxyl group.

In these compounds (K), C—O—Si component is usually present as alkoxy group or acetoxy group which directly bonds to silicon atom. Such alkoxy group or acetoxy group generally has less than 15 carbon atoms and may contain a heteroatom such as oxygen. Further, in these compounds, two or more silicon atoms may be present. When two or more silicon atoms are present, there are linked together through an oxygen atom (e.g., in case of siloxane), a silicon-silicon bond or a bifunctional organic group such as methylene group and phenylene group.

Examples of suitable organosilane compounds (K) are γ-aminopropyltriethoxysilane, 2-(3-cyclohexenyl)ethyltrimethoxysilane, 1,3-divinyltetraethoxysilane, vinyltris(2-methoxyethoxy)silane, 5-bicycloheptenyltriethoxysilane and γ-mercaptopropyltrimethoxysilane.

Amount of compounds (E), (F), (G), (H), (J) and (K) can be varied depending on an object, but is generally 200 parts by weight or less, preferably 80 parts by weight or less, more preferably 20 parts by weight or less and most preferably 0.01–10 parts by weight, per 100 parts of polyphenylene ether.

In modification of polyphenylene ether with the above-mentioned compounds (E), (F), (G), (H), (J), and (K), radical initiators may be used. The radical initiators include known organic peroxides and diazo compounds such as benzoyl peroxide, dicumyl peroxide, di-tert-butyl peroxide, tert-butylcumyl peroxide, tert-butyl hydroperoxide, cumene hydroperoxide and azobisisobutyronitrile. Amount of the radical initiator is 0.01–10 parts by weight, preferably 0.1–5 parts by weight per 100 parts by weight of polyphenylene ether.

In the present composition, the above compound may chemically react with polyphenylene ether, or may be combined with polyphenylene ether through physical interaction such as physical adsorption of the compound to polyphenylene ether.

Furthermore, as preferable modified polyphenylene ether, mention may be made of polymers obtained by grafting an unsaturated monomer other than the above-mentioned polyfunctional compound (F) having an unsaturated group or the polyfunctional compound (F) having an unsaturated group and an other unsaturated monomer onto polyphenylene ether in the presence of free-radical initiators.

The unsaturated monomers are preferably vinyl and/or vinylidene compounds (L). Examples of these compounds (L) are as follows: Aromatic vinyl or vinylidene compounds such as α-methylstyrene, o-, m- and p-methylstyrene, chlorostyrene, bromostyrene, divinylbenzene, hydroxystyrene and aminostyrene; olefins such as ethylene; acrylic or methacrylic acid ester compounds such as methyl acrylate or methacrylate, ethyl acrylate or methacrylate, propyl acrylate or methacrylate and octyl acrylate or methacrylate; cyanovinyl compounds such as acrylonitrile and methacrylonitrile; vinyl ester compounds such as vinyl acetate; vinyl ether compounds such as methylvinyl ether, ethylvinyl ether and butylvinyl ether; and unsaturated halogenated compounds such as vinyl chloride and vinylidene chloride. These may be used singly or in combination of two or more. These unsaturated monomers to be grafted are preferably styrene, styrene-glycidyl methacrylate, styrene-glycidyl acrylate, styrene-maleic anhydride, styrene-acrylic acid and styrene-methacrylic acid.

Amount of compound (L) is 200 parts by weight or less, preferably 0.5–100 parts by weight, more preferably 1–50 parts by weight per 100 parts by weight of polyphenylene ether.

Method for production of the modified polyphenylene ether in the present invention is not limitative, and known methods can be employed. Examples of the methods are as follows:

(1) Polyphenylene ether and the above compound in the form of pellets, powder, fine piece, etc. are uniformly mixed by a high-speed stirrer and then melt kneaded.

(2) The above compound is added to a solution in which polyphenylene ether is dissolved or swollen, to dissolve or swell the compound, followed by heating with stirring.

(3) The above compound is added to polyphenylene ether, and the mixture is dispersed in water and heated with stirring. In this method, it is preferred to use dispersion stabilizers such as polyvinyl alcohol, sodium dodecylbenzenesulfonate and calcium phosphate. In some case, a solvent which dissolves or swells polyphenylene ether may be added.

In the method (1), there are no limitations in temperature and time for melt kneading. The kneading temperature is generally 150°–350° C., though it may somewhat change depending on kind or amount of the compound. Any apparatus can be used for melt kneading as far as it can handle a molten viscous material, and either of batch or continuous method can be used. Examples of apparatus used for these methods are single-screw or multi-screw extruders, Banbury mixers, rolls, kneaders, etc.

Solvents used for the above-mentioned methods (2) and (3) have no special limitation, and any solvents which can dissolve or swell polyphenylene ether may be used.

Examples of these solvents are chloroform, methylene chloride, benzene, xylene, chlorobenzene, cyclohexane, styrene, toluene and o-chlorophenol. Mixed solvents may also be used, as long as they can dissolve or swell polyphenylene ether. There is not any limitation in temperature or time for mixing and, in general, temperature may be 20°–250° C. and time is 1 minute–10 hours.

When modified polyphenylene ether is used in the present invention, it is preferred to produce the resin composition by previously preparing the modified polyphenylene ether and then mixing it with other components, but it is also possible to produce the resin composition by simultaneously mixing the compound as modifier, polyphenylene ether and other components.

Thermoplastic polyester (B) is obtained by polycondensation of a dicarboxylic acid or its functional derivative and a dihydroxy compound or its functional derivative.

As examples of the dicarboxylic acid, mention may be made of aromatic dicarboxylic acids such as terephthalic acid, isophthalic acid and 2,6-naphthalenedicarboxylic acid; nuclear-substituted aromatic dicarboxylic acids in which a hydrogen atom of the aromatic nucleus of above aromatic dicarboxylic acid is substituted with methyl group, ethyl group, phenyl group or the like; aliphatic dicarboxylic acids having 2-20 carbon atoms such as adipic acid, sebacic acid and dodecane dicarboxylic acid; and alicyclic dicarboxylic acids such as cyclohexanedicarboxylic acid.

The functional derivatives of dicarboxylic acids include acid chlorides and esters such as carboxylic acid methyl esters and phenyl esters of the above-mentioned compounds.

Examples of the dihydroxy compounds are aliphatic diols and alicyclic diols such as ethylene glycol, 1,3-propanediol, 1,4-butanediol, 1,6-hexanediol, 1,10-decanediol, 1,4-cyclohexanediol and cyclohexanedimethanol and dihydric phenols represented by the following formula (V):

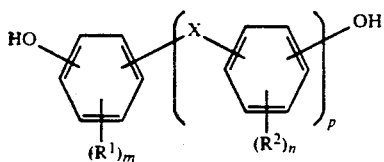

(V)

(wherein X represents a substituted or unsubstituted alkylene group of 1-20 carbon atoms, an alkylidene group of 1-10 carbon atoms, a cycloalkylene group of 4-8 carbon atoms, —O—, —S—, or —SO$_2$—, or the benzene nuclei directly link to each other, $R^1$ and $R^2$ each represents a halogen atom or an alkyl group of 1-12 carbon atoms, m and n each represents an integer of 0-4 and p represents 0 or 1). Examples of these dihydric phenols are bisphenol A, bis-(4-hydroxyphenyl)-methane, bis-(4-hydroxy-3-methylphenyl)-propane, 2,2-bis-(3',5'-dibromo-4'-hydroxyphenyl)-propane, 1,1-bis(4-hydroxyphenyl)-1-phenyl-ethane, bis(4-hydroxyphenyl)-diphenylmethane, 1,1-bis-(4'-hydroxyphenyl)-cyclohexane, resorcin, hydroquinone, 4,4'-dihydroxydiphenyl, bis-(4-hydroxyphenyl)sulfone and methyl-nuclear-substituted derivatives thereof.

Typical examples of the functional derivatives of dihydroxy compounds are diacetate derivatives.

The above compounds may be used singly or in combination of two or more. Moreover, copolymers of these compounds with p-hydroxybenzoic acid or polyethylene glycol may also be used.

Among these thermoplastic polyesters, preferred are polyethylene terephthalate, polybutylene terephthalate and modified polymers containing these structures such as copolymers with polyethers such as polyethylene glycol and polypropylene glycol.

Intrinsic viscosity of polyethylene terephthalate or polybutylene terephthalate is not critical but is preferably 0.5-2.5 dl/g, and optimum intrinsic viscosity depends on circumstances.

Mixing ratio of modified polyphenylene ether resin (A) and thermoplastic polyester (B) is modified polyphenylene ether resin; 5-95% by weight and thermoplastic polyester: 95-5% by weight. If amount of thermoplastic polyester is less than 5% by weight, effect to improve solvent resistance is small, and if it is more than 95% by weight, thermal properties such as heat distortion temperature tend to deteriorate.

Amino resin (D) which plays the most important role in improving compatibility between modified polyphenylene ether resin (A) and thermoplastic polyester (B) in the composition of the present invention is obtained by modifying with alcohol an addition reaction product of formaldehyde with at least one compound selected from melamine, guanamine and urea.

In more detail, the amino resin obtained by modifying melamine, guanamine and urea is represented by the following formula (I), (II) or (III).

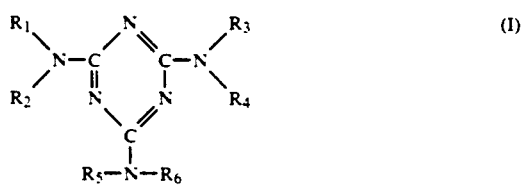

[wherein $R_1$, $R_2$, $R_3$, $R_4$, $R_5$ and $R_6$ each represents a hydrogen atom, a alkyl group, an aryl group or a substituent denoted by the formula (I'): (CH$_2$—O) $R_7$ (wherein $R_7$ represents a hydrogen atom or an alkyl or cycloalkyl group of 1-10 carbon atoms), and at least one of $R_1$-$R_6$ is a substituent denoted by the formula (I')].

Examples of the melamine resin represented by the formula (I) include etherfied melamine resins obtained by modifying various methylolmelamines including from monomethylolmelamine to hexamethylolmelamine produced by condensation of melamine (2,4,6-triamino-1,3,5-triazine) and formaldehyde, with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cycopentanol, n-hexyl alcohol, cyclohexanol, n-octyl alcohol, caprylic alcohol and n-decyl alcohol. Among them, preferred are methoxylated melamine resins and butoxylated melamine resins obtained by modification with lower alcohols such as methyl alcohol and butyl alcohol and mixed etherified melamine resins obtained by modification with these two alcohols. Especially preferred are hexamethoxymethylmelamine resin and hexabutoxymethylmelamine obtained by modifying with methyl alcohol or n-butyl alcohol hexamethylolmelamine which has been prepared by methylolating all the amino groups attached to triazine nucleus of melamine, from the points of compatibility and reactivity with other resins and storage stability.

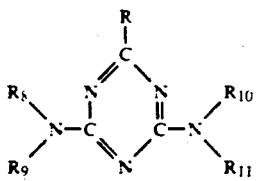

(II)

[wherein R represents a hydrogen atom, an alkyl group, an alkoxy group or an aryl group, $R_8$, $R_9$, $R_{10}$ and $R_{11}$ each represents a hydrogen atom, an alkyl group, an aryl group or a substituent represented by the above-mentioned formula (I'), and at least one of $R_8-R_{11}$ is a substituent represented by the formula (I')].

Examples of the guanamine resin represented by the formula (II) are etherified guanamine resins which are obtained by modifying various methylolguanamines including from monomethylolguanamine to tetramethylolguanamine produced by condensation of guanamine (6-substituted-2,4-diaminotriazine-1,3,5) and formaldehyde, with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among guanamines, preferred is benzoguanamine(2,4-diamino-6-phenyltriazine-1,3,5).

Among the above etherified guanamine resins, preferred are methoxylated guanamine resins and butoxylated guanamine resins obtained by modification with lower alcohols such as methyl alcohol and butyl alcohol, and mixed etherified guanamine resins obtained by modification with these two alcohols. Especially preferred are tetramethoxymethylbenzoguanamine resin and tetrabutoxymethylbenzoguanamine resin obtained by modifying with methyl alcohol or n-butyl alcohol tetramethylolbenzoguanamine which has been prepared by methylolating all the amino groups attached to triazine nucleus of benzoguanamine, from the points of compatibility and reactivity with other resins and storage stability.

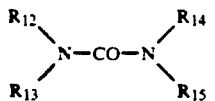

(III)

wherein $R_{12}$, $R_{13}$, $R_{14}$ and $R_{15}$ each represents a hydrogen atom, an alkyl group, an aryl group or a substituent represented by the above-mentioned formula (I'), and at least one of $R_{12}-R_{15}$ is a substituent represented by the formula (I').

Examples of the urea resins represented by the formula (III) are etherified urea resins which are obtained by modifying various methylolureas including from monomethylolurea to tetramethylolurea produced by condensation of urea and formaldehyde, with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among them, preferred are methoxylated urea resins and butoxylated urea resins obtained by modification with lower alcohols such as methyl alcohol and butyl alcohol, and mixed etherified urea resins obtained by modification with these two alcohols. Especially preferred are tetramethoxymethylurea resin and tetrabutoxymethylurea resin obtained by modifying with methyl alcohol or n-butyl alcohol tetramethylolurea prepared by methylolating all the amino groups of urea, from the points of compatibility and reactivity with other resins and storage stability.

These amino resins can be produced by various methods. For example, for producing methoxylated melamine resin, the following methods can be employed.

(1) A method which comprises allowing melamine to react with formalin under weak alkaline condition, liberating and drying the resulting methylolmelamine, etherifying the methylolmelamine in an alcohol under acidic condition and distilling off the reaction water together with alcohol.

(2) A method which comprises producing methylolmelamine in the same manner as in (1), partially dehydrating it in a reactor under reduced pressure, then adding an alcohol thereto to carry out reaction under acidic condition and removing the reaction water in the same manner as in (1).

Addition amount of amino resin (D) in the present invention is 0.01-10 parts by weight, preferably 0.1-5 parts by weight per 100 parts by weight of the composition comprising modified polyphenylene ether resin (A) and thermoplastic polyester (B). If it is less than 0.01 part by weight, the effect aimed at by the present invention tends to decrease, and if it is more than 10 parts by weight, softening point of the composition tends to decrease.

In order to highly improve impact strength, it is preferred to add a rubber-like polymer (C) as an impact strength modifier.

The rubber-like polymer (C) used in the present invention means a natural or synthetic polymer which is elastic at room temperature, for example, 20°-25° C.

Examples of the rubber-like polymer (C) are natural rubber; diene rubbers such as polybutadiene, polyisoprene and polychloroprene; copolymers of diene and vinyl monomer such as styrene-butadiene random copolymer, styrene-butadiene block copolymer, styrene-butadiene-styrene block copolymer, styrene-isoprene random copolymer, styrene-isoprene block copolymer, styrene-isoprene-styrene block copolymer, styrene-grafted polybutadiene, and butadiene-acrylonitrile copolymer; copolymers of polyisobutylene, isobutylene and butadiene or isoprene; ethylenepropylene copolymer and ethylene-propylene-non-conjugated diene copolymer; ethylene-butene-1 copolymer; ethylene-acrylic acid copolymer and alkali metal salts thereof so-called ionomers; ethylene-glycidyl acrylate copolymer; ethylene-alkyl acrylate copolymer such as ethylene-ethyl acrylate copolymer and ethylene-butyl acrylate copolymer; and Thiokol rubber, polysulfide rubber, acrylic rubber, polyurethane rubber, polyether rubber, epichlorohydrin rubber, polyester elastomers and polyamide elastomers.

These rubber-like polymers can be produced by various processes such as emulsion polymerization and solution polymerization using various catalysts such as peroxides, trialkyl-aluminum, lithium halides and nickel-based catalysts.

Furthermore, there may also be used those which have various crosslinking degrees, various proportions of micro-structures such as cis structure, trans structure and vinyl group, or various average particle sizes of rubber in the resin composition.

Various copolymers such as random copolymers, block copolymers and graft copolymers may be used as the rubber-like polymers of the present invention.

The rubber-like polymers may be copolymerized with other monomers such as other olefins, diens, aromatic vinyl compounds, acrylic acid, acrylic acid esters and methacrylic acid esters at preparation of the rubber-like polymers. Methods for copolymerization may be any methods such as random copolymerization, block copolymerization and graft copolymerization. As examples of the monomers, mention may be made of ethylene, propylene, styrene, chlorostyrene, α-methylstyrene, butadiene, isoprene, chlorobutadiene, butene-1, isobutylene, methyl acrylate, acrylic acid, ethyl acrylate, butyl acrylate, glycidyl acrylate, methyl methacrylate, acrylonitrile, maleic anhydride and glycidyl methacrylate.

Furthermore, there may also be used various modified rubber-like polymers. They include, for example, hydroxy or carboxy terminal-modified polybutadienes, partially or completely hydrogenated styrene-butadiene, styrene-butadiene-styrene, styrene-sioprene or styrene-isoprene-styrene block copolymers, rubber-like polymers modified with at least one compound having in its molecule at least one group selected from carboxyl group, amino group, imino group, epoxy group, amide group, vinyl group, isocyanate group and hydroxyl group or with at least one compound selected from acid anhydride, carboxylic acid ester and oxazoline ring, more specifically, ethylene-propylene copolymer, ethylene-propylene-nonconjugated copolymer, styrene-butadiene copolymer including A-B or A-B-A' block, random and graft copolymer and hydrogenated copolymer thereof, styrene-isoprene copolymer including A-B or A-B-A' block, random and graft copolymer and hydrogenated copolymer thereof which have been modified with acrylic acid, himic anhydride, glycidyl methacrylate or maleic anhydride. The modification can be performed by known methods such as graft copolymerization and random copolymerization. These rubber-like polymers may be used singly or in combination of two or more.

In addition, diene rubbers and copolymers of diene and a vinyl compound having various micro structures of double bond such as vinyl group, cis-1,4 bond or trans 1,4-bond may also be used as the rubber-like polymer of the present invention.

Preferred rubber-like polymers include copolymers comprising 40-100% by weight of butadiene and 60-0% by weight of styrene, copolymers comprising 65-82% by weight of butadiene and 35-18% by weight of acrylonitrile, styrene-butadiene or styrene-butadiene-styrene block copolymers including all of their linear block copolymers, radial block copolymers, etc. and hydrogenated products thereof, styrene-isoprene or styrene-isoprene-styrene block copolymers and hydrogenated products thereof, styrene-grafted polybutadiene obtained by adding styrene to polybutadiene or butadiene-styrene copolymer latex and emulsion-polymerizing it with a radical initiator, ethylene-propylene copolymer and ethylene-propylene-nonconjugated diene copolymer and these polymers modified with maleic anhydride, glycidyl methacrylate or styrene.

The rubber-like polymer (C) is used in an amount of 0-100 parts by weight, preferably 50 parts by weight or less and more preferably 30 parts by weight or less per 100 parts by weight of the composition comprising the modified polyphenylene ether resin (A) and the thermoplastic polyester (B).

In practice of the present invention, it is also possible to add other polymers and aids to the resin composition of the present invention. These other polymers include, for example, polyolefins such as polyethylene, polypropylene, ethylene-propylene block copolymer, polymethylpentene and ethylene-α-olefin copolymers, e.g., ethylene-butene copolymer, ethylene-4-methylpentene copolymer and ethylene-pentene copolymer having a density of 0.90-0.97 g/cm$^3$; homopolymers or copolymers of various vinyl compounds such as polyvinyl chloride, polymethyl methacrylate, polyvinyl acetate, polyvinylpyridine, polyvinylcarbazole, polyacrylamide, polyacrylonitrile, ethylene-vinyl acetate copolymer and aromatic vinyl polymers; polysulfones, polyether sulfones and polyphenylene sulfide; polyamides such as 6-nylon, 6,6-nylon and 12-nylon; condensation-polymerized compounds such as polyacetal; and various thermosetting resins such as silicone resin, fluororesin, polyimide, polyamideimide, phenol resin, alkyd resin, unsaturated polyester resin, epoxy resin and Dapon resin.

Among the above-mentioned other polymers, preferred are polyolefins, polyamides, and (M) aromatic vinyl polymers, copolymers of aromatic vinyl compounds and other monomers, or rubber-modified aromatic vinyl polymers defined below.

The aromatic vinyl polymers, copolymers of aromatic vinyl compounds and other monomers or rubber-modified aromatic vinyl polymers (M) are selected from those which have at least 25% by weight of polymer unit derived from a monomer having the following formula:

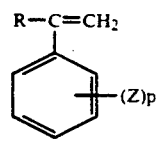

wherein R represents a hydrogen atom, a lower alkyl group such as an alkyl group of 1-4 carbon atoms or a halogen atom, Z represents a hydrogen atom, a vinyl group, a halogen atom, an amino group, a hydroxyl group or a lower alkyl group, and p represents 0 or an integer of 1-5.

As examples of the aromatic vinyl polymers and copolymers of aromatic vinyl compounds and other monomers, mention may be made of homopolymers such as polystyrene, polychlorostyrene and poly-α-methylstyrene and copolymers thereof, and styrene-containing copolymers such as styrene-acrylonitrile copolymer, styrene-maleic anhydride copolymer, styrene-glycidyl methacrylate copolymer, styrene-acrylic acid copolymer, styrene-N-phenylmaleimide copolymer, styrene-divinylbenzene copolymer and styrene-acrylonitrile-α-methylstyrene copolymer. Among these polymers, preferred are polystyrene, styrene-α-methylstyrene copolymer, styrene-acrylonitrile copolymer, styrene-α-chlorostyrene copolymer, styrene-methyl methacrylate copolymer, styrene-glycidyl methacrylate copolymer, styrene-maleic anhydride copolymer and styrene-acrylic acid copolymer.

The rubber modified aromatic vinyl polymers are those which comprise an aromatic vinyl polymer or copolymer matrix in which rubber particles are dispersed to form a two-phase system. They can be produced by mechanical mixing of the above-mentioned rubber-like polymer (C) and the aromatic vinyl polymer or copolymer or by dissolving rubber in aromatic vinyl compound monomer, followed by polymerization of the aromatic vinyl compound monomer. According to the latter method, so-called high-impact polystyrenes such as styrene-butadiene rubber-modified polystyrene, ethylene-propylene rubber-modified polystyrene and polybutadiene rubber-modified polystyrene ar industrially produced.

These polymers may be previously mixed with modified polyphenylene ether resin or thermoplastic polyester as component (A) or component (B), or polyphenylene ether may be modified with the compounds (E)-(K) as a modifier in the presence of these polymers. Furthermore, it is also possible to simultaneously mix the modified polyphenylene ether resin (A) with thermoplastic polyester (B), compounds (E)-(K) as modifiers, rubber-like polymer (C), amino resin (D) and the above polymer. Any other sequences of mixing may also be employed. Some reaction or reactions among (A)-(D) may occur in the mixing.

As the aids which can be mixed with the resin composition of the present invention, mention may be made of, for example, reinforcing agents such as glass fiber, carbon fiber, potassium titanate fiber and high-modulus polyamide fiber; inorganic or organic fillers such as carbon black, silica, $TiO_2$, talc, calcium carbonate, magnesium sulfate and wollastonite; plasticizers such as triphenyl phosphate and phthalic acid esters; lubricants, stabilizers, flame retardants such as $Sb_2O_3$, halogen compounds and phosphoric acid esters, dyes or pigments.

The method for producing the resin composition of the present invention is not limitative and any known methods can be used.

A method in which the components are mixed in the form of solutions and solvents are evaporated or in which said mixture is precipitated in a non-solvent, is effective. However, from industrial viewpoint, a method of kneading them in molten state is employed in practice. The melt kneading is carried out using such a kneading machine as generally used single-screw or twin-screw extruders and various kneaders. Twin-screw high performance extruders are especially preferred.

Before kneading, it is preferred to uniformly blend respective resin components in the form of powder or pellet using such a mixer as a tumbler or a Henschel mixer. However, each resin may be separately fed directly to a kneading apparatus through a metering device without the blending.

The kneaded resin composition can be molded by injection, extrusion or various other molding processes. The present invention further includes a method in which molded articles are obtained by dry-blending the components at the beginning of injection molding or extrusion molding and then directly kneading the components during its operation of melt processing, without the previous kneading.

There is no special limitation in sequence of kneading of the components. Respective components may be kneaded at the same time or modified polyphenylene ether resin (A) and amino resin (D) may be previously kneaded to obtain a composition and then impact strength modifier (C) and thermoplastic polyester (B) may be kneaded with the composition, that is, respective components in molten state can be kneaded at two or more steps. Further, using a kneading machine having two or more introduction openings, components (A), (C) and (D) may be introduced from the introduction opening of upperstream side and component (B) may be introduced from the opening of downstream side. Other sequences of kneading may also be employed.

The present invention will be set forth in more detail by way of the following examples, but these examples are merely illustrative of the present invention and the present invention is not restricted to these examples. In the examples, heat distortion temperature (H.D.T.) and Izod impact strength (thickness: 3.2 mm) were respectively measured according to JIS K7207 and JIS K7110, and part(s) means part(s) by weight unless otherwise indicated.

REFERENCE EXAMPLE 1

Preparation of Amino Resin (D)

D-1: 28.3 parts of urea, 100 parts of 37% neutral formalin and 60 parts of n-butanol were mixed and heated from 25° C. to 94°-96° C. in 15-25 minutes. The mixture was kept at that temperature for 10-15 minutes and 0.07 part of formic acid was added thereto. Then, the mixture was refluxed for 30-60 minutes under atmospheric pressure. The reaction system was cooled to 70°-75° C. while the pressure was reduced so that the reaction system was kept boiling and water was removed by azeotropy with butanol under a reduced pressure of 200-400 mmHg. Thereafter, temperature was gradually raised to 100°-105° C. to obtain butoxylated urea (D-1). Analysis showed that the number of butanol bonded was about 2 mol per 1 mol of urea.

D-2: A mixture of 378 parts of melamine and 810 parts of 37% formalin was adjusted to pH 7-8 with sodium hydroxide. The mixture was heated to about 70° C. and when it became transparent, 1800 parts of methyl alcohol and 1.9 parts of oxalic acid were added thereto. Then, the mixture was boiled for several minutes. The reaction mixture was cooled, filtrated and then concentrated under reduced pressure to obtain methoxylated melamine resin (D-2). Analysis showed that the number of methanol bonded was about 3 mol per 1 mol of melamine.

D-3: In the same manner as in D-2, methoxylated melamine resin (D-3) was prepared from 378 parts of melamine, 1700 parts of 37% formalin and 3600 parts of methanol. Analysis showed that the number of methanol bonded was about 6 mol per 1 mol of melamine.

D-4: A mixture of 187 parts of benzoguanamine and 268 parts of 37% formalin were adjusted to pH 7-8 with sodium hydroxide. The mixture was heated to about 70° C. and when it became transparent, 600 parts of methyl alcohol and 0.6 part of oxalic acid were added thereto. Then, the mixture was boiled for several minutes. The reaction mixture was cooled, filtrated and then concentrated under reduced pressure to obtain methoxylated benzoguanamine resin (D-4). Analysis showed that the number of methanol bonded was about 3 mol per 1 mol of benzoguanamine.

EXAMPLE 1

To 5 kg of poly-2,6-dimethylphenylene ether (intrinsic viscosity measured in chloroform at 25° C.: 0.43 dl/g) were added 50 g of maleic anhydride and 10 g of dicumyl peroxide, and then these were mixed by Henschel mixer. The mixture was melt kneaded at 300°–320° C. by a twin-screw extruder and pelletized to obtain maleic anhydride modified polyphenylene ether (hereinafter referred to as "M-PPE"). Then, 2 kg of M-PPE, 3 kg of polyethylene terephthalate (PET resin SA-1206 manufactured by Unitika Ltd.) and 100 g of amino resin (D-3) were again mixed by Henschel mixer and pelletized at 270°–300° C. by a twin-screw extruder. The pellets were vacuum-dried at 130° C. for 3–4 hours and injection-molded to obtain a test piece. The test piece was cut by a microtome and then etched with carbon tetrachloride, and dispersed particle size of polyphenylene ether phase was observed by a scanning electron microscope. It was recognized that the polyphenylene ether phase was disspersed in the form of fine particles of about 1 $\mu$ or less. It was also seen that when the molded product was immersed in chloroform at room temperature for 30 minutes, the molded product showed no change.

COMPARATIVE EXAMPLE 1

Example 1 was repeated except that amino resin (D-3) was not used. State of dispersion of polyphenylene ether phase and polyethylene terephthalate phase was bad, and lump of polyphenylene ether phase of about 10 $\mu$ or more was seen. When the molded product was immersed in chloroform, it was swollen, and a part of the resin was dissolved out.

As can be seen from comparison of the results of Example 1 with those of Comparative Example 1, the composition of the present invention was excellent in solvent resistance and markedly improved compatibility between polyphenylene ether and thermoplastic polyester.

REFERENCE EXAMPLE 2

To 5 kg of poly-2,6-dimethylphenylene ether having an intrinsic viscosity of 0.45 dl/g measured in chloroform at 25° C. were added 100 g of maleic anhydride and 20 g of dicumyl peroxide, and these were mixed by Henschel mixer and the mixture was melt kneaded and pelletized at 300°–320° C. by a twin-screw extruder. The product was referred to as "M-PPE (1)".

REFERENCE EXAMPLE 3

Reference Example 2 was repeated except that dicumyl peroxide was not used. The product was referred to as "M-PPE (2)".

REFERENCE EXAMPLE 4

Reference Example 2 was repeated except that glycidyl methacrylate was used in place of maleic anhydride. The product was referred to as "GMA-PPE".

REFERENCE EXAMPLE 5

Reference Example 3 was repeated except that glutaric acid was used in place of maleic anhydride. The product was referred to as "G-PPE".

REFERENCE EXAMPLE 6

To 5 kg of poly-2,6-dimethylphenylene ether was added 20 liters of xylene and was further added 500 g of trimellitic anhydride acid chloride, and the mixture was kept at the refluxing temperature of xylene for 4 hours with stirring. The reaction mixture was cooled and then was poured in 40 liters of methanol to precipitate modified polyphenylene ether. And the precipitates were filtrated and dried. The product was referred to as "T-PPE".

EXAMPLES 2–10

Amino resins mentioned in Reference Example 1, modified polyphenylene ethers mentioned in Reference Examples 2–6, thermoplastic polyesters and rubber-like polymers mentioned in Table 1 were melt kneaded at the ratios shown in Table 1 at 250°–300° C. by a twin-screw extruder to obtain pellets.

The pellets were injection-molded to make test pieces of a given size, and properties of the test pieces were measured. The results are shown in Table 1.

COMPARATIVE EXAMPLES 2 AND 3

Examples 7 and 9 were repeated except that unmodified polyphenylene ether (PPE) used in Reference Example 2 was used in place of M-PPE (1) or M-PPE(2). The results are shown in Table 1.

TABLE 1

| | Composition | | | | | | | | Izod impact impact strength (23° C., with notch) kg · cm/cm | H.D.T. (4.6 kg/cm$^2$) °C. |
|---|---|---|---|---|---|---|---|---|---|---|
| | Modified polyphenylene ether resin (A) | | Thermoplastic polyester (B)*2 | | Amino resin (D) | | Rubber-like polymer (C)*3 | | | |
| | Kind | Amount (Part by weight) | Kind | Amount (Part by weight) | Kind | Amount (Part by weight) | Kind | Amount (Part by weight) | | |
| Example 2 | M-PPE(1) | 35 | PET | 65 | D-1 | 2.5 | SBS | 15 | 43 | 153 |
| Example 3 | M-PPE(2) | 65 | " | 35 | D-2 | 1.5 | SEBS | 10 | 38 | 167 |
| Example 4 | GMA-PPE | 50 | " | 50 | D-3 | 0.5 | St-EPR | 20 | 55 | 150 |
| Example 5 | G-PPE | 30 | " | 70 | D-4 | 3.0 | M-SEBS | 15 | 60 | 142 |
| Example 6 | T-PPE | 70 | " | 30 | D-2 | 1.0 | SEP | 25 | 53 | 155 |
| *1 Example 7 | M-PPE(1) | 40 | " | 60 | D-3 | 2.0 | MEP | 15 | 57 | 157 |
| Example 8 | M-PPE(1) | 45 | PBT | 55 | D-2 | 0.7 | EMGMA | 20 | 50 | 168 |
| Example 9 | M-PPE(2) | 55 | " | 45 | D-3 | 1.0 | SEP | 13 | 42 | 173 |
| Example 10 | GMA-PPE | 30 | " | 70 | D-3 | 1.5 | GMA-EPR | 18 | 47 | 156 |
| Comparative Example 2 | PPE | 40 | PET | 60 | D-3 | 2.0 | MEP | 15 | 28 | 158 |
| Comparative | PPE | 55 | PBT | 45 | D-3 | 1.0 | SEP | 13 | 23 | 163 |

TABLE 1-continued

| Composition | | | | | | | | Izod impact impact strength (23° C., with notch) kg·cm/cm | H.D.T. (4.6 kg/cm²) °C. |
|---|---|---|---|---|---|---|---|---|---|
| Modified polyphenylene ether resin (A) | | Thermoplastic polyester (B)*2 | | Amino resin (D) | | Rubber-like polymer (C)*3 | | | |
| Kind | Amount (Part by weight) | Kind | Amount (Part by weight) | Kind | Amount (Part by weight) | Kind | Amount (Part by weight) | | |
| Example 3 | | | | | | | | | |

Note
*1 Modified polyphenylene ether resin (M-PPE (1)) and rubber-like polymer (MEP) were previously melt kneaded.
*2 PBT: Polybutylene terephthalate having an intrinsic viscosity of 1.25 dl/g. PET: Polyethylene terephthalate having an intrinisc viscosity of 1.00 dl/g.
*3 SBS: Styrene-butadiene-styrene block copolymer (CARIFLEX ® TR-1101 manufactured by Shell Chemical Co.)
SEBS: Hydrogenated styrene-butadiene-styrene block copolymer (KRATON ® G-1650 manufactured by Shell Chemical Co.).
St-EPR: Styrene modified (grafted) ethylene-propylene copolymer (EPR: ESPRENE ® E-120P manufactured by Sumitomo Chemical Co., Ltd., styrene/ethylene-propylene-40/100 wt %).
M-SEBS: Maleic anhydride modified hydrogenated styrene-butadiene-styrene block copolymer (KRATON ® FG-1901X manufactured by Shell Chemical Co.).
SEP: Hydrogenated styrene-isoprene block copolymer (KRATON ® G-1701X manufactured by Shell Chemical Co.).
MEP: Maleic anhydride modified ethylene-propylenecopolymer (EP. ESPRENE ® E-120P manufactured by Sumitomo Chemical Co., Ltd., grafting degree of maleic anydride. 1.4 wt %).
EMGMA: Ethylene-methacrylic acid ester-glycidyl methacrylate copolymer (ethylene/methacrylic acid ester/glycidyl methacrylate = 56.5/42/1.5 wt %).
GMA-EPR: Glycidyl methacrylate modified ethylene-propylene copolymer (EPR. ESPRENE ® E-120P manufactured by Sumitomo Chemical Co., Ltd.; grafting degree of glycidyl methacrylate: 1.2 wt %).

According to the present invention, a composition is provided which is improved in stability of compatibility between thermoplastic polyester and polyphenylene ether and excellent in processability, solvent resistance and impact strength, and the composition can be put to various uses.

The novel composition provided by the present invention can be easily processed into molded articles, sheets and films by processing methods used for thermoplastic resins such as injection molding, extrusion molding and the like, and thus affords products good in impact resistance, heat resistance, solvent resistance and processability. The composition is especially useful for injection molding.

We claim:

1. A resin composition which comprises:
100 parts by weight of a composition comprising (A) 5-95 wt.% of a modified polyphenylene ether resin and (B) 95-5 wt% of a thermoplastic polyester, and (D) 0.01-10 parts by weight of an amino resin obtained by modifying with an alcohol an addition reaction product of formaldehyde and at least one compound selected from the group consisting of melamine, guanamine and urea.

2. A resin composition according to claim 1, wherein the modified polyphenylene ether resin (A) is one which is obtained by modifying polyphenylene ether with a polyfunctional compound (E) which has in its molecule at least one group selected from the group consisting of carboxyl group, acid anhydride group, acid amide group, imide group, carboxylic acid ester group, epoxy group, amino group and hydroxyl group, in the presence or absence of a radical initiator.

3. A resin composition according to claim 2, wherein the polyfunctional compound (E) is a compound (F) which has in its molecule both (a) carbon-carbon double bond or carbon-carbon triple bond and (b) at least one group selected from the group consisting of carboxyl group, acid anhydride group, acid amide group, imide group, carboxylic acid ester group, epoxy group, amino group and hydroxyl group.

4. A resin composition according to claim 2, wherein the polyfunctional compound (E) is a compound (G) selected from the group consisting of an aliphatic carboxylic acid, an acid ester and an acid amide represented by the formula: $(R^{I}O)_m R(COOR^{II})_n(CONR^{III}R^{IV})_s$ wherein R represents a linear or branched saturated aliphatic hydrocarbon residue having 2-20 carbon atoms; $R^{I}$ each independently represents a hydrogen atom or an alkyl, aryl, acyl or carbonyldioxy group having 1-10 carbon atom; $R^{II}$ each independently represents a hydrogen atom or an alkyl or aryl group having 1-20 carbon atoms; $R^{III}$ and $R^{IV}$ each independently represent a hydrogen atom or an alkyl or aryl group having 1-10 carbon atoms; m, n, and s each represent 0 or an integer of 1 or more, and $m+n+s \geq 2$, and a derivative thereof.

5. A resin composition according to claim 2, wherein the polyfunctional compound (E) is a compound (H) which has in its molecule both (a) acid halide group and (b) at least one functional group selected from the group consisting of carboxyl group, acid anhydride group, carboxylic acid ester group and acid amide group.

6. A resin composition according to claim 1, wherein the modified polyphenylene ether resin (A) is one which is obtained by modifying polyphenylene ether with an epoxy compound (J) comprising at least one compound selected from the group consisting of a compound having an oxirane ring in its molecule and a condensation-polymerized product of dihydric phenol and epichlorohydrin, in the presence or absence of a radical initiator.

7. A resin composition according to claim 1, wherein the modified polyphenylene ether resin (A) is one which is obtained by modifying polyphenylene ether with an organosilane compound (K) which has in its molecule simultaneously (a) at least one silicon atom which bonds to a carbon atom through oxygen atom, (b) carbon-carbon double bond or carbon-carbon triple bond and (c) at least one functional group selected from the group consisting of amino group, mercapto group, carboxyl group, acid anhydride group, acid amide group, carboxylic acid ester group, imide group and hydroxyl group, in the presence or absence of a radical initiator.

8. A resin composition according to claim 1, wherein the amino resin (D) is an amino resin represented by the following formula (I), (II) or (III):

(I)

$$\begin{array}{c} R_1 \\ \diagdown \\ R_2 \end{array} N-C \begin{array}{c} N \\ \diagup \diagdown \\ \end{array} C-N \begin{array}{c} R_3 \\ \diagup \\ R_4 \end{array}$$
$$\phantom{xxxx} N \diagdown \diagup N$$
$$\phantom{xxxxxx} C$$
$$\phantom{xxxxx} | $$
$$\phantom{xxxx} R_5-N-R_6$$

wherein $R_1$, $R_2$, $R_3$, $R_4$, $R_5$ and $R_6$ each represent a hydrogen atom, an alkyl group, an aryl group or a substituent denoted by the formula (I'):

$$-(CH_2-O)R_7- \quad (I')$$

wherein $R_7$ represents a hydrogen atom or an alkyl or cycloalkyl group of 1-10 carbon atoms, and at least one of $R_1-R_6$ is a substituent denoted by the formula (I'),

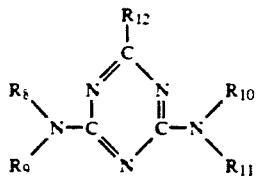
(II)

Wherein $R_{12}$ represents a hydrogen atom, an alkyl group, an alkoxy group or a aryl group, $R_8$, $R_9$, $R_{10}$ and $R_{11}$ each represent a hydrogen atom, an alkyl group, an aryl group or a substituent represented by the above-mentioned formula (I'), and at least one of $R_8-R_{11}$ is a substituent represented by the formula (I'),

(III)

wherein $R_{13}$, $R_{14}$, $R_{15}$ and $R_{16}$ each represent a hydrogen atom, an alkyl group, an aryl group or a substituent represented by the above-mentioned formula (I'), and at least one of $R_{13}-R_{16}$ is a substituent represented by the formula (I').

9. A resin composition according to claim 1 which additionally comprises (M) an aromatic vinyl polymer or a copolymer of an aromatic vinyl compound and an other monomer.

* * * * *